United States Patent
Sugihara

(10) Patent No.: US 11,341,630 B2
(45) Date of Patent: May 24, 2022

(54) LIGHTING FOR DEFECT INSPECTION OF SHEET-SHAPED OBJECTS, DEFECT INSPECTION APPARATUS FOR SHEET-SHAPED OBJECTS, AND METHOD OF DEFECT INSPECTION OF SHEET-SHAPED OBJECTS

(71) Applicant: Toray Industries, Inc., Tokyo (JP)

(72) Inventor: Hiroki Sugihara, Otsu (JP)

(73) Assignee: Toray Industries, Inc., Tokyo (JP)

( * ) Notice: Subject to any disclaimer, the term of this patent is extended or adjusted under 35 U.S.C. 154(b) by 0 days.

(21) Appl. No.: 17/277,401

(22) PCT Filed: Aug. 23, 2019

(86) PCT No.: PCT/JP2019/033190
§ 371 (c)(1),
(2) Date: Mar. 18, 2021

(87) PCT Pub. No.: WO2020/059426
PCT Pub. Date: Mar. 26, 2020

(65) Prior Publication Data
US 2021/0358109 A1 Nov. 18, 2021

(30) Foreign Application Priority Data
Sep. 21, 2018 (JP) .............................. JP2018-176918

(51) Int. Cl.
G06T 7/00 (2017.01)
F21V 11/14 (2006.01)
H04N 5/225 (2006.01)

(52) U.S. Cl.
CPC ............ G06T 7/0004 (2013.01); F21V 11/14 (2013.01); H04N 5/2256 (2013.01)

(58) Field of Classification Search
CPC ..... G06T 7/0004; F21V 11/14; H04N 5/2256; G01N 2021/8905; G01N 21/896;
(Continued)

(56) References Cited

U.S. PATENT DOCUMENTS 5,493,123 A * 2/1996 Knollenberg ...... G01N 21/8806
250/358.1
6,490,032 B1 12/2002 Zhou et al.
(Continued)

FOREIGN PATENT DOCUMENTS

JP 04270949 A 9/1992
JP 2006098198 A 4/2006
(Continued)

OTHER PUBLICATIONS

International Search Report and Written Opinion for International Application No. PCT/JP2019/033190, dated Oct. 21, 2019, 6 pages.

*Primary Examiner* — Marnie A Matt
(74) *Attorney, Agent, or Firm* — RatnerPrestia

(57) ABSTRACT

A lighting for defect inspection of sheet-shaped objects includes: an elongated light application unit configured to apply illumination light to a sheet-shaped object, the light application unit extending in a second direction that is orthogonal to a first direction on a surface of the sheet-shaped object; a first light shielding unit that is located on a light path from the light application unit to the sheet-shaped object, the first light shielding unit having light shielding sections and opening sections alternately arranged; and a second light shielding unit that is located between the first light shielding unit and the sheet-shaped object, the second light shielding unit having light shielding sections and opening sections alternately arranged in a direction parallel to the second direction.

13 Claims, 11 Drawing Sheets

(58) Field of Classification Search
CPC ............ G01N 21/8901; G01N 21/892; G01N 21/8851; G01N 2021/8816; G01N 21/9501; G01N 21/88; G01N 2021/8822
USPC .......................................................... 348/88
See application file for complete search history.

(56) References Cited

U.S. PATENT DOCUMENTS

| | | | | |
|---|---|---|---|---|
| 7,796,805 | B1* | 9/2010 | Kirk | G01N 21/9501 382/149 |
| 2004/0105093 | A1* | 6/2004 | Hamamatsu | G01N 21/9501 356/237.4 |
| 2008/0075352 | A1* | 3/2008 | Shibuya | G06K 9/6254 382/141 |
| 2008/0192257 | A1* | 8/2008 | Uda | G03F 7/70616 356/445 |
| 2008/0304055 | A1* | 12/2008 | Oshima | G01N 21/9501 356/237.5 |

FOREIGN PATENT DOCUMENTS

| | | |
|---|---|---|
| JP | 2008216148 A | 9/2008 |
| JP | 2013253906 A | 12/2013 |
| JP | 2015068670 A | 4/2015 |
| JP | 2017125805 A | 7/2017 |
| JP | 2018124147 A | 8/2018 |
| JP | 6389977 B1 | 9/2018 |

\* cited by examiner (a) (b)

(a)  (b)

(a)  (b)

LIGHTING FOR DEFECT INSPECTION OF SHEET-SHAPED OBJECTS, DEFECT INSPECTION APPARATUS FOR SHEET-SHAPED OBJECTS, AND METHOD OF DEFECT INSPECTION OF SHEET-SHAPED OBJECTS

CROSS REFERENCE TO RELATED APPLICATIONS

This is the U.S. National Phase application of PCT/JP2019/033190, filed Aug. 23, 2019, which claims priority to Japanese Patent Application No. 2018-176918, filed Sep. 21, 2018, the disclosures of these applications being incorporated herein by reference in their entireties for all purposes.

FIELD OF THE INVENTION

The present invention relates to a lighting for defect inspection of sheet-shaped objects, a defect inspection apparatus for sheet-shaped objects, and a method of defect inspection of sheet-shaped objects.

BACKGROUND OF THE INVENTION

Conventionally, for the purpose of inspecting the presence or absence of defects such as scratches in a sheet-shaped object having a smooth surface, inspection apparatuses and inspection methods are available that apply light to a sheet-shaped object and, if a defect such as a scratch is present, detect the defect such as a scratch in the sheet-shaped object by reading out the scattered light caused by the scratch. In such an inspection apparatus, a linear light-application unit, such as a fluorescent lamp, and an imaging unit are typically arranged parallel to or almost parallel to the width direction of the sheet-shaped object to receive and detect the scattered light caused by defects.

The severity of a defect (such as a scratch) is typically determined by the magnitude of the amount of received scattered light (the magnitude of light amount value) to prevent the outflow of products with serious defects that pose a quality problem, and to perform quality control.

With the method for detecting a defect such as a scratch in a transparent sheet-shaped object described above, light may be reflected on the sheet-shaped object for inspection, or light may be transmitted through the sheet-shaped object for inspection. Referring to FIGS. 13 to 16, the principle of detecting defects such as scratches in a transparent sheet-shaped object that is continuously transferred in the above method is now described. FIGS. 13 and 14 are diagrams illustrating the defect detection principle of an inspection that is performed with light reflected on the inspection target, and FIGS. 15 and 16 are diagrams illustrating the defect detection principle of an inspection performed with light transmitted through the inspection target. In FIGS. 13 and 14, a linear application light source 12 is arranged so as to extend in a direction perpendicular to the plane of the drawing, and a defect 100 (see FIGS. 14 and 16) in a sheet-shaped object 5 also extends in a direction perpendicular to the plane of the drawing. In general, since the width direction of the sheet-shaped object 5 often coincides with the longitudinal direction of the linear application light source 12, a direction perpendicular to the plane of the drawing (Y direction) is referred to as a sheet width direction (light source longitudinal direction), a right-left direction on the plane of the drawing (X direction) is referred to as a transfer direction in which the sheet-shaped object 5 is continuously transferred, and is also referred to as a sheet longitudinal direction (light source lateral direction), and an up-down direction on the plane of the drawing (Z direction) is referred to as a sheet vertical direction (imaging unit optical-axis direction).

FIGS. 13 and 14 illustrate a situation in which the linear application light source 12 and an imaging unit 6 are arranged at the same side of the sheet-shaped object 5, and the reflected scattered light caused by a defect 100, which is located in the surface of the sheet-shaped object 5 and parallel to the width direction (Y direction), is detected to detect the defect. Here, an optical center line 8 of the imaging unit 6 is arranged so as to be offset from an optical axis 10 (specular reflection optical axis) of the light that is emitted by the linear application light source 12 and specularly reflected on the sheet-shaped object. As such, when the surface of the sheet-shaped object 5 is free of a defect, light is reflected only in a direction that is linearly symmetrical with the incident light with respect to the normal to the surface of the sheet-shaped object 5 (the Z direction in this example) as illustrated in FIG. 13, so that no light enters the imaging unit 6. However, when the surface of the sheet-shaped object 5 has a defect 100 parallel to the width direction (Y direction), reflected scattered light 14 is created by the defect 100 parallel to the width direction (Y direction) as illustrated in FIG. 14. Of the reflected scattered light 14, a component 15 directed toward the imaging unit 6 enters the imaging unit 6, enabling the detection of the defect.

FIGS. 15 and 16 illustrate a situation in which the linear application light source 12 and the imaging unit 6 are arranged at opposite sides of the sheet-shaped object 5, and the transmitted scattered light caused by a defect 100, which is located in the surface of the sheet-shaped object 5 and parallel to the width direction (Y direction), is detected to detect the defect. Here, the optical center line 8 of the imaging unit 6 is arranged so as to be offset from the optical axis of the linear application light source 12. As such, when the surface of the sheet-shaped object 5 is free of a defect, light is not scattered and transmitted linearly through the sheet as illustrated in FIG. 15, so that no light enters the imaging unit 6. However, when the surface of the sheet-shaped object 5 has a defect 100 parallel to the width direction (Y direction), transmitted scattered light 16 is created by the defect 100 parallel to the width direction (Y direction) as illustrated in FIG. 16. Of the transmitted scattered light 16, the component 17 directed toward the imaging unit 6 enters the imaging unit 6, enabling the detection of the defect.

However, in the above method, the scattered light is strong and the sensitivity is high when light is applied, the incidence plane of which is perpendicular to the direction of the scratch, while the scattered light is weak and the sensitivity is low when light is applied, the incidence plane of which is parallel to the direction of the scratch. Consequently, when the above method uses a light source such as a fluorescent lamp or a parallel-bundle optical fiber light, which are common linear application light sources, the detection sensitivity for a scratch that is parallel to the sheet width direction (Y direction) is high, but there is the problem that the detection sensitivity for a scratch that is parallel to the sheet longitudinal direction (X direction) is low.

Patent Literature 1 discloses a technique for detecting scratches parallel to the sheet longitudinal direction (X direction) with high sensitivity. FIG. 17 is a perspective view schematically illustrating an embodiment disclosed in Patent Literature 1. As illustrated in FIG. 17, Patent Literature 1 discloses an inspection apparatus including a linear light-application unit 18 formed by optical fibers, an imaging unit 6, and the like. It is disclosed that the imaging unit 6 performs reading with a monitor camera, such as a line CCD camera, as a solid-state imaging device that detects light. The linear light-application unit 18, which is formed by optical fibers, consists of at least two systems of optical fiber bundles 18a and 18b, which are arranged such that an optical axis directions of the light emitted from optical fiber emission ends form an angle of θ7a and an angle of θ7b, respectively, with the Z direction. In FIG. 17, the optical fiber bundles 18a and 18b have light emission ends that are directed in different directions. This inspection apparatus is of a technique that detects a defect 101 parallel to the longitudinal direction X of the sheet-shaped object 5 by applying light, the incidence plane of which is perpendicular to the defect 101. The angles θ7a and θ7b are uniform over the X direction in each system, and such lighting is referred to as oblique lighting. The oblique lighting with the angles θ7a and θ7b of crossing is referred to as cross oblique lighting.

Patent Literature

Patent Literature 1: Japanese Patent Application Laid-open No. 2008-216148

SUMMARY OF THE INVENTION

However, the inspection method of Patent Literature 1 has the following problem. This problem is described with reference to FIG. 17. When detecting a defect 101 that is parallel to the longitudinal direction (X direction), the inspection method of Patent Literature 1 creates transmitted scattered light 16 having a certain degree of directivity and intensity distribution. The distribution and intensity of the transmitted scattered light 16 depend on the intensity of application light 13, the angles θ7a and θ7b that the application light 13 forms in the X direction with the axis in the Z direction, and the severity, shape, size, etc. of the scratch, but do not depend on the position of the scratch. As such, the transmitted scattered light 16 created by a defect 101 that is parallel to the longitudinal direction (X direction) is stronger when the severity of the scratch is greater, and is weaker when the severity of the scratch is lower. In general, an inspection apparatus determines the severity of a scratch based on the amount of received light. With the example described above, a scratch of low severity may fail to create a sufficient amount of light to be received, causing the defect to be overlooked.

In order to avoid such oversight, the angles θ7a and θ7b that are formed by the application light 13 in the X direction with the axis in the Z direction are typically reduced to an extent that does not cause incident light to directly enter the imaging unit 6 and thus hinder the inspection. This reduction increases the intensity of the transmitted scattered light 16 caused by a scratch relative to the severity of the scratch, thereby achieving a sufficient amount of light to be received and thus the detection of the defect.

However, in the inspection method of Patent Literature 1, optical fibers are used as a mechanism of controlling the angles θ7a and θ7b of the light emitted by the linear light-application unit 18. With an optical fiber, the light aperture angle φ (the angle of spreading of light from the optical fiber emission end) is generally determined by the material of the optical fiber. For example, the light aperture angle φ is 70 degrees for a commonly used multicomponent glass fiber, the light aperture angle φ is 60 degrees for an inexpensive plastic fiber, and the light aperture angle φ is 25 degrees for an expensive quartz fiber. In the distribution of the light intensity with respect to the light emission direction, the light intensity is highest in the center direction perpendicular to the fiber end, and the component spreading away from the center in the peripheral direction is gradually weakened. As such, the aperture angle of an optical fiber has a certain extent, and reductions in light intensity are inevitable in the peripheral angular portion. This imposes a limitation on the detection of a scratch with low severity.

Additionally, as described above, in the distribution of the light intensity with respect to the light emission direction, the light intensity of the light emitted by an optical fiber is highest in the center direction perpendicular to the fiber end, and the component spreading away from the center in the peripheral direction is gradually weakened. However, even though the component spreading in the peripheral direction is weak, there is a certain amount of light component leaking as diffused light from the light emission end surface and the side surface, for example, of the optical fiber. Consequently, when the linear light-application unit 18 formed by optical fibers is placed directly under the center of the optical axis of the imaging unit 6, it is inevitable that some light components leaking from the optical fibers will directly enter the imaging unit 6. For this reason, the amount of light is set low enough to avoid saturation of the brightness value, which hinders the detection of scratches, when the leaking light component is imaged by the imaging unit 6. In this case, the intensity of the transmitted scattered light 16 caused by scratches cannot be relatively increased, so that a sufficient amount of light may not be obtained. This imposes a limitation on the detection of a scratch with low severity.

The linear light-application unit 18 formed by optical fibers can be inclined in the sheet longitudinal direction (X direction) from the position directly under the center of the optical axis of the imaging unit 6, so that the light component leaking from the optical fibers does not directly enter the imaging unit 6, avoiding the saturation of the brightness value when the light is imaged by the imaging unit 6. This allows the amount of light to be increased. However, in this case, since the light application direction is a combination of the longitudinal direction (X direction) and the width direction (Y direction), light cannot be applied in a direction perpendicular to a defect 101 that is parallel to the longitudinal direction (X direction), failing to achieve a sufficient detection sensitivity for the defect 101 parallel to the longitudinal direction (X direction).

For the reasons described above, it is significantly advantageous to detect scratches parallel to the sheet longitudinal direction (X direction) with high sensitivity.

In view of the above, the present invention provides lighting for defect inspection of sheet-shaped objects, a defect inspection apparatus for sheet-shaped objects, and a method of defect inspection of sheet-shaped objects that detect a scratch parallel to the transfer direction of a sheet-shaped object with high sensitivity.

Solution to Problem

A lighting for defect inspection of sheet-shaped objects according to the present invention to solve the problem is to be used for defect inspection of sheet-shaped objects. The lighting includes: an elongated light application unit configured to apply illumination light to a sheet-shaped object, the light application unit extending in a second direction that is orthogonal to a first direction on a surface of the sheet-shaped object, the first direction being a direction in which the sheet-shaped object moves relative to the lighting; a first light shielding unit that is located on a light path from the light application unit to the sheet-shaped object, the first light shielding unit having light shielding sections and opening sections alternately arranged in a direction parallel to the second direction; and a second light shielding unit that is located, between the first light shielding unit and the sheet-shaped object, on the light path from the light application unit to the sheet-shaped object, the second light shielding unit having light shielding sections and opening sections alternately arranged in a direction parallel to the second direction. The opening sections of the first light shielding unit are located between the light shielding sections of the second light shielding unit and the light application unit in a third direction orthogonal to the first and second directions, and the opening sections of the first light shielding unit have a smaller length in the second direction than the light shielding sections of the second light shielding unit have.

In the lighting for defect inspection of sheet-shaped objects according to the present invention, it is preferable that the light shielding sections of the first light shielding unit and/or the light shielding sections of the second light shielding unit include, on sides facing the light application unit, light reflection members that protrude toward the light application unit.

A defect inspection apparatus for sheet-shaped objects according to the present invention to solve the problem includes: the lighting for defect inspection of sheet-shaped objects according to the present invention; an imaging unit configured to image light that is emitted by the lighting for defect inspection and transmitted through the sheet-shaped object; and an image processing unit configured to detect a defect occurring in the sheet-shaped object based on imaging data obtained by the imaging unit.

In the defect inspection apparatus for sheet-shaped objects according to the present invention, it is preferable that a longitudinal direction of the light application unit is parallel to an imaging direction of the imaging unit, in the imaging unit, optical axes at positions along the imaging direction are parallel to each other, and at each position at which light emitted by the lighting for defect inspection is transmitted through the sheet-shaped object, an angle formed by a transmission direction of light transmitted through the sheet-shaped object with an optical axis of the imaging unit is larger than an aperture angle of the imaging unit.

A defect inspection apparatus for sheet-shaped objects according to the present invention to solve the problem includes: the lighting for defect inspection of sheet-shaped objects according to the present invention; an imaging unit configured to image light that is emitted by the lighting for defect inspection and reflected on the sheet-shaped object; and an image processing unit configured to detect a defect occurring in the sheet-shaped object based on imaging data obtained by the imaging unit.

In the defect inspection apparatus for sheet-shaped objects according to the present invention, it is preferable that a longitudinal direction of the light application unit is parallel to an imaging direction of the imaging unit, in the imaging unit, optical axes at positions along the imaging direction are parallel to each other, and at each position at which light emitted by the lighting for defect inspection is reflected on the sheet-shaped object, an angle formed by a reflection direction of light specularly reflected on the sheet-shaped object with an optical axis of the imaging unit is larger than an aperture angle of the imaging unit.

In the defect inspection apparatus for sheet-shaped objects according to the present invention, it is preferable that the imaging unit includes a telecentric lens.

The defect inspection apparatus for sheet-shaped objects according to the present invention, it is preferable that the imaging unit includes a one-dimensional light receiving unit having a same length as a length in the imaging direction.

The defect inspection apparatus for sheet-shaped objects according to the present invention, it is preferable that the one-dimensional light receiving unit is a contact image sensor.

A method of defect inspection of sheet-shaped objects according to the present invention to solve the problem is a method for inspecting presence or absence of a defect of a sheet-shaped object by using a lighting unit and an imaging unit and by imaging light that is emitted by the lighting unit and transmitted through the sheet-shaped object with the imaging unit. The method includes: emitting, with the lighting unit, light with which an angle formed by a transmission direction of light transmitted through the sheet-shaped object with an optical axis of the imaging unit is larger than an aperture angle of the imaging unit at each position at which the light emitted by the lighting unit is transmitted through the sheet-shaped object, along a second direction orthogonal to a first direction on a surface of the sheet-shaped object, the first direction being a direction in which the sheet-shaped object moves relative to the lighting unit; imaging with the imaging unit whose imaging direction is parallel to the second direction of the sheet-shaped object and whose optical axes at positions along the imaging direction are parallel to each other; and determining presence or absence of a defect of the sheet-shaped object by using image data imaged by the imaging unit.

A method of defect inspection of sheet-shaped objects according to the present invention to solve the problem is a method for inspecting presence or absence of a defect of a sheet-shaped object by using a lighting unit and an imaging unit and by imaging light that is emitted by the lighting unit and reflected on the sheet-shaped object with the imaging unit. The method includes: emitting, with the lighting unit, light with which an angle formed by a reflection direction of specular reflection light reflected on the sheet-shaped object with an optical axis of the imaging unit is larger than an aperture angle of the imaging unit at each position at which the light emitted by the lighting unit is reflected on the sheet-shaped object, along a second direction orthogonal to a first direction on a surface of the sheet-shaped object, the first direction being a direction in which the sheet-shaped object moves relative to the lighting unit; imaging with the imaging unit whose an imaging direction is parallel to the second direction of the sheet-shaped object and whose optical axes at positions along the imaging direction are parallel to each other; and determining presence or absence of a defect of the sheet-shaped object by using image data imaged by the imaging unit.

According to the present invention, when detecting scratches parallel to the transfer direction of a sheet-shaped object, it is possible to detect defects with high sensitivity.

DETAILED DESCRIPTION OF EMBODIMENTS OF THE INVENTION

Embodiments of a lighting for defect inspection of sheet-shaped objects, a defect inspection apparatus for sheet-shaped objects, and a method of defect inspection of sheet-shaped objects are described in detail below with reference to the drawings. However, the present invention is not limited to these embodiments.

In the present invention, the "sheet-shaped object" is a sheet or plate-shaped object, such as a film, but not limited thereto. However, it needs to be transparent or translucent for inspection with a transmission optical system. The "defect" refers to a scratch, extraneous matter, soil, unevenness, or the like present on or in the surface of the sheet-shaped object. The "imaging unit" refers to a unit capable of converting light into an electric signal, and a line sensor camera in which light receiving elements are one-dimensionally arranged, for example, is preferably used. However, it is not limited to a line sensor camera, and an area sensor camera with two-dimensional configuration, a photomultiplier, or other component may also be used. The "optical axis" refers to a line from the inspection surface to the light receiving element of the imaging unit.

Embodiments

<Defect Inspection Apparatus for Sheet-Shaped Objects>

A defect inspection apparatus for sheet-shaped objects of an embodiment according to the present invention is now described in detail. It is sufficient that a defect inspection apparatus for sheet-shaped objects according to the present invention includes lighting for defect inspection of sheet-shaped objects according to the present invention, an imaging unit, and an image processing unit, and there is no limitation as to the presence or absence of additional unit. The additional unit illustrated below are examples, and the design can be changed as appropriate.

Figure 1:
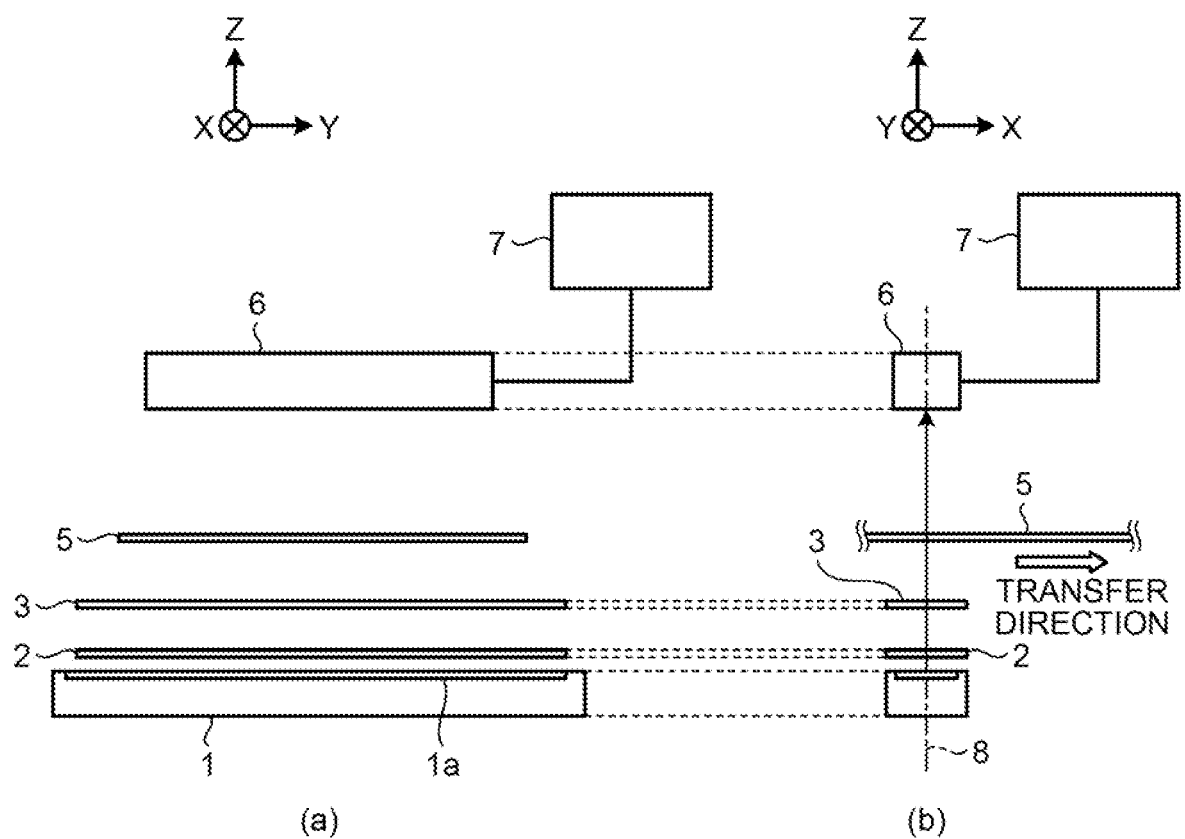
FIG. 1 is a schematic view of one embodiment of a defect inspection apparatus for sheet-shaped objects of embodiments according to the present invention.

Referring to FIG. 1, a defect inspection apparatus for sheet-shaped objects of an embodiment is now described. FIG. 1 is a schematic view of one embodiment of a defect inspection apparatus for sheet-shaped objects of embodiments according to the present invention. Hereinafter, a longitudinal direction of a sheet-shaped object 5 (light source lateral direction), which is also the transfer direction in which the sheet-shaped object 5 is continuously transferred, is referred to as an X direction, a width direction of the sheet-shaped object is referred to as a Y direction, and a vertical direction orthogonal to the longitudinal direction and the width direction (imaging unit optical-axis direction) is referred to as a Z direction. The X, Y, and Z directions are orthogonal to one another. The width direction of the sheet-shaped object is orthogonal to the longitudinal direction of the sheet-shaped object (transfer direction) on a surface of the sheet-shaped object. (a) of FIG. 1 is a plan view illustrating the configuration of the defect inspection apparatus as viewed from the X direction. (b) of FIG. 1 is a plan view illustrating the configuration of the defect inspection apparatus as viewed from the Y direction. The X direction corresponds to a first direction, the Y direction corresponds to a second direction, and the Z direction corresponds to a third direction. This defect inspection apparatus is formed by lighting for defect inspection of sheet-shaped objects according to the present invention, an imaging unit 6, which images the light that is emitted by the lighting for defect inspection and transmitted through the sheet-shaped object 5, and an image processing unit 7, which detects a defect occurring in the sheet-shaped object 5 based on the imaging data obtained by the imaging unit 6. This defect inspection apparatus is an example in which the lighting for defect inspection and the imaging unit 6 are arranged in transmission configuration.

<Lighting for Defect Inspection of Sheet-Shaped Objects>

Figure 2:
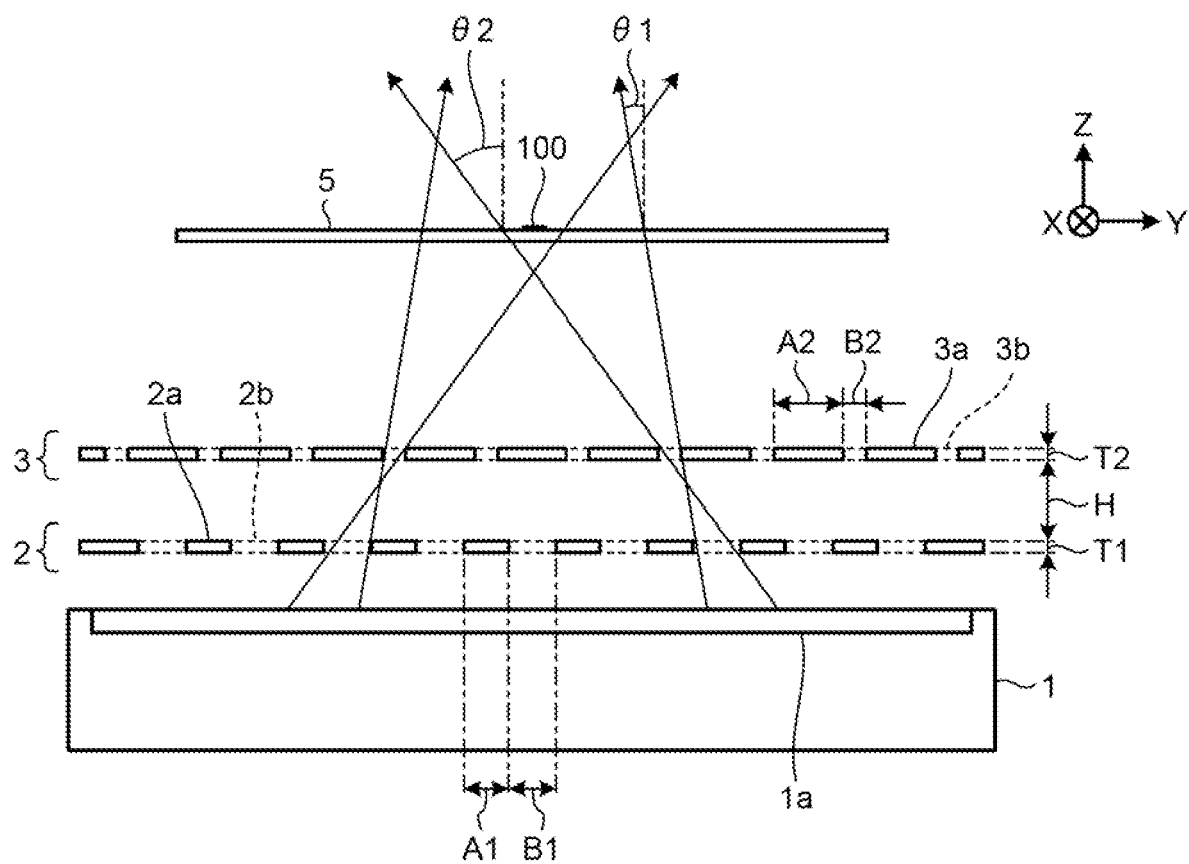
FIG. 2 is a schematic view of one embodiment of lighting for defect inspection of sheet-shaped objects of embodiments according to the present invention.

With reference to FIGS. 1 and 2, the lighting for defect inspection of sheet-shaped objects of an embodiment is now described. FIG. 2 is a schematic view of one embodiment of lighting for defect inspection of sheet-shaped objects of embodiments according to the present invention. A light application unit 1 applies light emitted by a light emitting portion 1a to the sheet-shaped object 5. The light application unit 1 is arranged so that the longitudinal direction thereof is parallel to the width direction (Y direction) of the sheet-shaped object 5. The light emitting portion 1a is provided on one surface of the light application unit 1 that faces toward the sheet-shaped object, and has a light emission surface that emits diffused light. The light application unit 1 emits light along the width direction (Y direction) of the sheet-shaped object 5. It is preferable that the diffused light be completely diffused light. The light emitting portion 1a is therefore formed by a fluorescent tube, LED lighting with a diffuser plate, or the like. The light emitting portion 1a may have a configuration in which a large number point light emitters, such as LEDs or optical fibers, are uniformly arranged. The emission color is not particularly specified, and white light or monochromatic light of red, green, blue, or other colors with flat spectral wavelength characteristics, or light in a wavelength band other than visible light such as ultraviolet light and infrared light may be used. Alternatively, light beams of any of these wavelength bands may be combined.

A first light shielding unit 2 is provided directly above the light emitting portion 1a. The first light shielding unit 2 includes light shielding sections 2a and opening sections 2b. The light shielding sections 2a and the opening sections 2b are alternately and continuously arranged in a direction parallel to the width direction (Y direction). The light shielding sections 2a of the first light shielding unit 2 may be made of any material that can block the light emitted by the light application unit. For example, a strip-shaped metal plate is preferably used that is manufactured by punching out the sections corresponding to the opening sections 2b and in which the light shielding section 2a and the opening sections 2b are continuously arranged. A resin plate may be used as long as the light shielding property is provided. Furthermore, a highly transparent strip-shaped plate having no light shielding property may be used, and light shielding paint may be applied to the sections of the plate corresponding to the light shielding sections 2a, or light shielding plates may be bonded to these sections. In any case, it is important that a member that has light shielding property is used for the light shielding sections 2a.

A second light shielding unit 3 is provided between the first light shielding unit 2 and the sheet-shaped object 5. In the same manner as the first light shielding unit 2, the second light shielding unit 3 also includes light shielding sections 3a and opening sections 3b, and the light shielding section 3a and the opening sections 3b are alternately and continuously arranged in the direction parallel to the width direction (Y direction). Of the light emitted by the light application unit 1, part of the light transmitted through the opening sections 2b of the first light shielding unit 2 is blocked by the light shielding sections 3a. Provided that a member that has light shielding property is used for the light shielding sections 3a, the second light shielding unit 3 may have a similar configuration as the first light shielding unit 2.

Between the opening sections 3b of the second light shielding unit 3 and the light emitting portion 1a, the light shielding sections 2a of the first light shielding unit 2 are located such that the light shielding sections 2a are aligned with the center positions of the opening sections 3b in the perpendicular direction (Z direction). Additionally, between the light shielding sections 3a of the second light shielding unit 3 and the light emitting portion 1a, the opening sections 2b of the first light shielding unit 2 are located such that the opening sections 2b are aligned with the center positions of the light shielding sections 3a in the perpendicular direction (Z direction). Furthermore, the opening sections 2b of the first light shielding unit 2 have a shorter length in the width direction (Y direction) than the light shielding sections 3a of the second light shielding unit 3 have. With such a configuration, of the light emission component emitted from the light application unit 1 in the perpendicular direction (Z direction), the light transmitted through the opening sections 2b of the first light shielding unit 2 is blocked by the light shielding sections 3a of the second light shielding unit 3 and is not applied to the sheet-shaped object 5. Out of the light components emitted by the light application unit 1 and traveling obliquely to the width direction (Y direction) from the perpendicular direction, the light transmitted through the opening sections 2b of the first light shielding unit 2 and the opening sections 3b of the second light shielding unit 3 is applied to the sheet-shaped object 5.

When the width of each light shielding section 2a of the first light shielding unit 2 is A1, the width of each opening section 2b of the first light shielding unit 2 is B1, the width of each light shielding section 3a of the second light shielding unit 3 is A2, the width of each opening section 3b of the second light shielding unit 3 is B2, the distance between the first light shielding unit 2 and the second light shielding unit 3 is H, the thickness of the first light shielding unit 2 is T1, and the thickness of the second light shielding unit 3 is T2, the minimum emission angle θ1 and the maximum emission angle θ2 of the light emitted by the first light shielding unit 2 toward the sheet-shaped object 5 and transmitted through two opening section 2b and 3b are expressed by following Expressions 1 and 2, respectively. The emission angle is an angle formed by light (the traveling direction of the light) and the optical axis direction of the imaging unit 6 (Z direction).

$$\theta 1 = \arctan((A2-B1)\div(2\times H)) \quad \text{(Expression 1)}$$

$$\theta 2 = \arctan((B2+(A2+B1)\div 2)\div(H+T1+T2)) \quad \text{(Expression 2)}$$

(Imaging Unit)

Out of the light emitted by the lighting for defect inspection toward the sheet-shaped object 5 and scattered/refracted/reflected by a defect 100 on the sheet-shaped object 5, the imaging unit 6 receives the component in the direction of the optical axis (optical center line 8) of the imaging unit 6 and outputs it as image data. In contrast, when the sheet-shaped object 5 is free of a defect 100, the imaging unit 6 does not receive light of the component in the direction of the optical center line 8. The imaging unit 6 preferably has a configuration in which a line sensor camera, which includes a one-dimensional light receiving unit, and an optical lens are combined. When the imaging unit 6 includes a one-dimensional light receiving unit, the imaging unit 6 is arranged such that the scanning direction of the imaging unit 6 is parallel to the longitudinal direction (transfer direction) of the sheet-shaped object 5. Alternatively, a configuration may be used in which an area sensor camera, which includes a two-dimensional light receiving unit, and an optical lens are combined.

(Image Processing Unit)

The image processing unit 7 receives image data from the imaging unit 6 and detects any defect (image of a defect 100) in the image data. The image processing unit 7 may include general image processing for defect inspection. For example, a brightness irregularity correction unit for correcting brightness irregularity, a spatial filter for extracting specific frequency component defect candidates from image data, a binarization unit for narrowing down defect candidates by the degree of brightness of the defect candidates, a determination unit for determining whether a defect is present or the degree of a defect based on a single piece of shape information, such as the area or length, or a combination of a plurality of pieces of shape information, a periodicity determination unit for determining the periodicity of defects occurring with a certain length periodicity in the longitudinal direction X of the sheet-shaped object 5, or the like may be provided. The result of determination by the image processing unit 7 is reported by an output unit provided in the image processing unit 7, or output to an external device. The determination result output to an external device is output by an output unit provided in the external device or stored as determination information.

In the defect inspection apparatus for sheet-shaped objects of the present embodiment, the longitudinal direction of the light application unit 1 forming the lighting for defect inspection is preferably parallel to the imaging direction of the imaging unit 6, and optical axes at positions along the imaging direction of the imaging unit 6 are preferably parallel to each other. Consequently, over the entire imaging range of the sheet-shaped object 5, the angle formed by the optical axis of the imaging unit 6 with the light emitted by the lighting for defect inspection (for example, light at an emission angle of θ1 to θ2) is uniform at any position in the imaging range. As a result, it is possible to detect a defect with the same sensitivity regardless of the position in the imaging range. The "imaging direction" used herein refers to, for example, the scanning direction of the one-dimensional imaging elements forming a part of the one-dimensional light receiving unit, that is, the arrangement direction of the one-dimensional imaging elements. Additionally, at each position where light emitted by the lighting for defect inspection is transmitted through or reflected on the sheet-shaped object 5, the angle formed by the transmission direction of the light transmitted through the sheet-shaped object 5 or the specular reflection direction of the light reflected on the sheet-shaped object 5 with the optical axis of the imaging unit 6 is preferably larger than the aperture angle of the imaging unit 6. Consequently, when the sheet-shaped object 5 is free of a defect, the light emitted by the lighting for defect inspection is not received by the imaging unit 6, thereby improving the inspection sensitivity. The term "aperture (aperture angle) of the imaging unit" as used herein refers to the maximum angle formed by the light that can enter and be received by the imaging unit 6 with the optical axis of the imaging unit 6. Light at an angle smaller than the aperture (angle) of the imaging unit 6 is received by the imaging unit 6, but light at an angle larger than the aperture (angle) is not received.

The lighting for defect inspection in the defect inspection apparatus of the embodiment described above includes the elongated light application unit 1 that applies illumination light to a sheet-shaped object and has a longitudinal direction that extends in the width direction of the sheet-shaped object, the first light shielding unit 2 that is located on a light path from the light application unit 1 to the sheet-shaped object 5, the first light shielding unit 2 having light shielding sections 2a and opening sections 2b alternately arranged in a direction parallel to the longitudinal direction of the light application unit 1, and the second light shielding unit 3 that is located, between the first light shielding unit 2 and the sheet-shaped object 5, on the light path from the light application unit 1 to the sheet-shaped object 5, the second light shielding unit 3 having light shielding sections 3a and opening sections 3b alternately arranged in the direction parallel to the longitudinal direction of the light application unit 1. The opening sections 2b of the first light shielding unit 2 are located between the light shielding sections 3a of the second light shielding unit 3 and the light application unit 1, and the opening sections 2b of the first light shielding unit 2 have a shorter length in the direction parallel to the longitudinal direction of the light application unit 1 than the light shielding sections 3a of the second light shielding unit 3 have. According to the present embodiment, the component in the optical axis (optical center line 8) direction of the imaging unit 6 is blocked, and thus the diffused light caused by a defect is detected in a reliable manner. It is therefore possible to detect defects with high sensitivity when detecting scratches that are parallel to the longitudinal direction of the sheet-shaped object and scratches that are parallel to a direction orthogonal to the longitudinal direction.

The elongated sheet-shaped object 5 may be transferred in the longitudinal direction X by a roll-to-roll transfer process, or flat sheets of sheet-shaped object 5 may be held and transferred by a uniaxial or biaxial linear transfer apparatus. Alternatively, the sheet-shaped object 5 may be fixed or temporarily stopped so as not to move, and the imaging unit 6 and the lighting for defect inspection are held and transferred by a uniaxial or biaxial linear transfer apparatus to image the entire surface of the sheet-shaped object 5. As for the transfer of the sheet-shaped object 5, or of the imaging unit 6 and the lighting for defect inspection, a rotary encoder or a linear encoder may be used to synchronize the transfer speed with the imaging timing of the imaging unit 6.

(First Modification)

Figure 3:
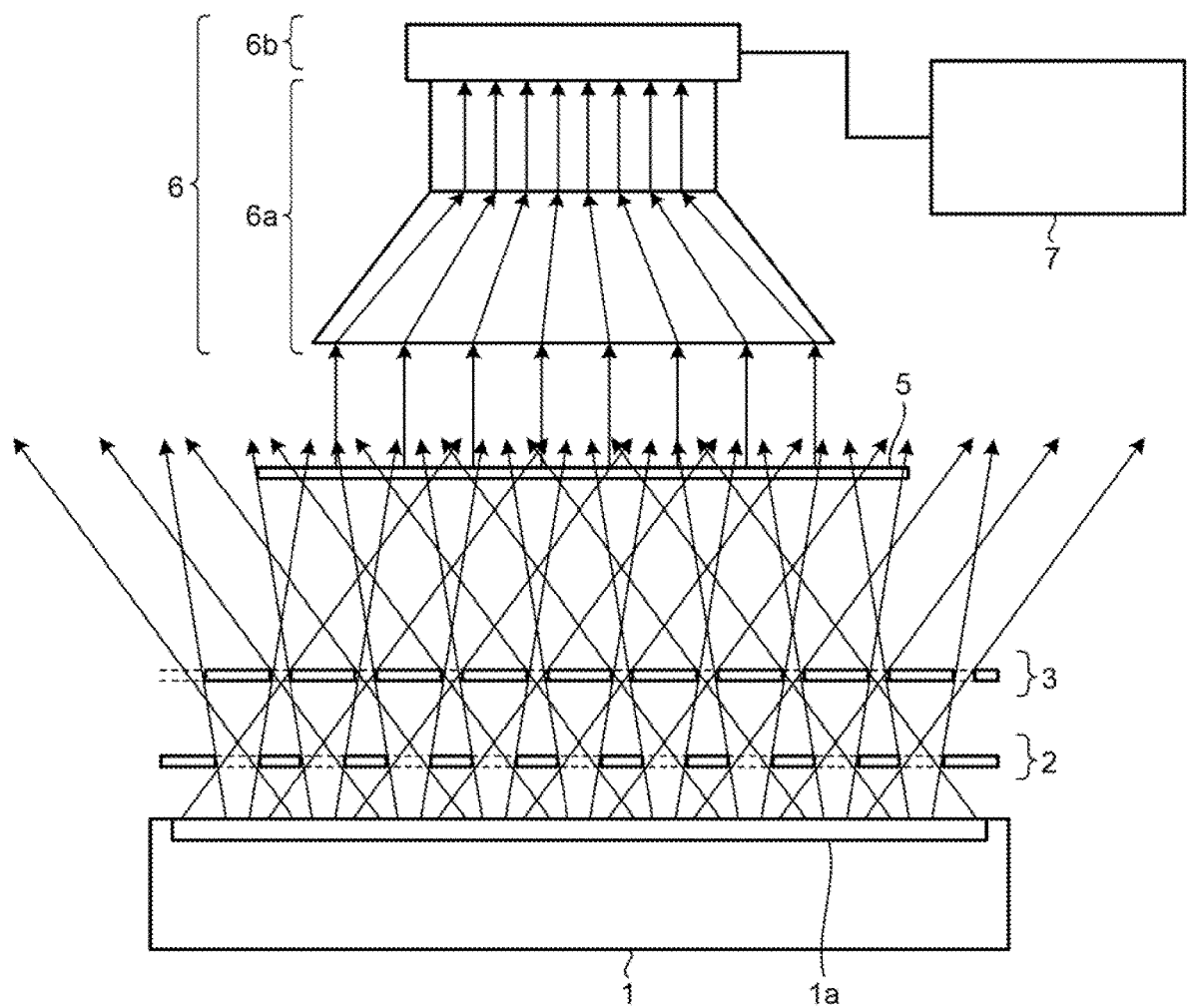
FIG. 3 is a schematic view of an imaging unit of a first modification, which is another embodiment of a defect inspection apparatus for sheet-shaped objects according to the present invention having a configuration in which a telecentric lens is provided as the lens of the imaging unit.

The imaging unit 6 may include a telecentric lens as the optical lens. Details are described with reference to FIG. 3. FIG. 3 is a schematic view of an imaging unit of a first modification, which is an embodiment of the defect inspection apparatus for sheet-shaped objects according to the present invention having a configuration in which a telecentric lens is provided as the lens of the imaging unit. Unlike a general optical lens, the telecentric lens 6a is a lens that has an aperture stop at the focal position of the lens, and the principal ray is parallel to the lens optical axis (the angle of view is 0°) on the object side (the side corresponding to the sheet-shaped object 5), on the image side (the side corresponding to the imaging unit), or on both sides. Consequently, in the effective field of view of the telecentric lens 6a, the optical axes on the imaging unit 6 are in a uniform direction, so that it is easy to set the angle formed by the direction of light transmitted through or reflected on the sheet-shaped object 5 with the optical axis of the imaging unit 6 to be larger than the aperture angle of the imaging unit 6 at each position where light emitted by the lighting for defect inspection of sheet-shaped objects is transmitted through or reflected on the sheet-shaped object 5.

(Second Modification)

Figure 4:
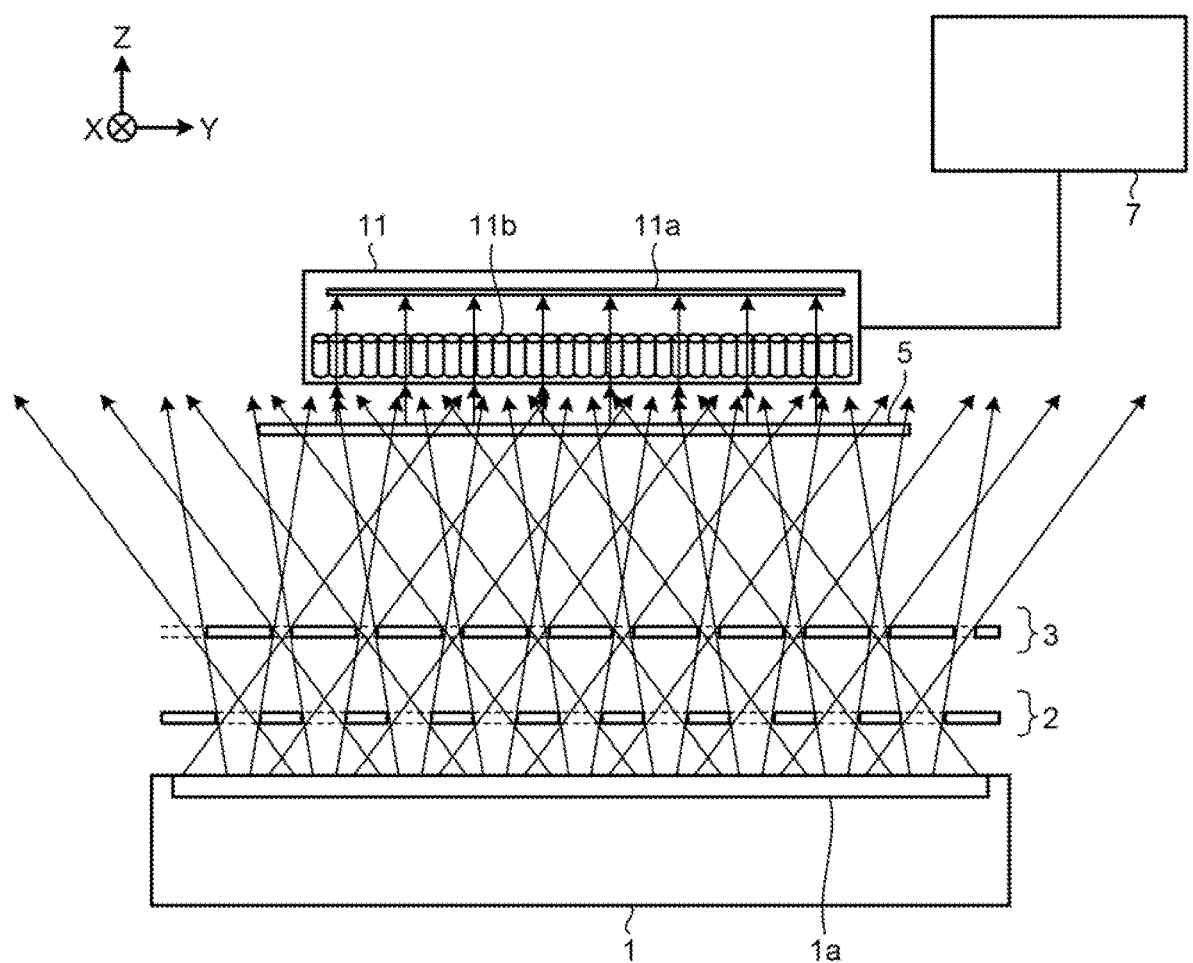
FIG. 4 is a schematic view of an imaging unit of a second modification, which is another embodiment of a defect inspection apparatus for sheet-shaped objects according to the present invention having a configuration in which a proximity image sensor is provided as the imaging unit.

Alternatively, the imaging unit may include a one-dimensional light receiving unit having the same length as the length of the imaging region in the width direction (Y direction) (length in the imaging direction) of the sheet-shaped object 5. Specifically, a contact image sensor may be used as the one-dimensional light receiving unit. Details are described with reference to FIG. 4. FIG. 4 is a schematic view of an imaging unit of a second modification in which a proximity image sensor is provided as the imaging unit. The proximity image sensor 11 is also called a contact image sensor or CIS and includes a one-dimensional light receiving sensor array 11a, which has the same width as the imaging field of view, and a rod-shaped lens array 11b of equal-magnification imaging system lenses, which is arranged in front of the sensor array 11a. An optical system including a combination of a general optical lens and a camera has a reduction or magnification depending on the relation in size between the imaging field of view and the image sensor, so that the optical system involves an angle of view in accordance with the reduction or magnification. In contrast, with the proximity image sensor 11, which has an equal-magnification optical system, the angle of view is parallel (0 degrees). Consequently, in the effective field of view of the proximity image sensor 11, the optical axes on the imaging unit 6 are substantially in a uniform direction.

According to the second modification, the width of the one-dimensional light receiving unit is equal to the length in the imaging direction, so that it is easy to set the angle formed by the direction of light transmitted through or reflected on the sheet-shaped object 5 with the optical axis of the imaging unit 6 to be larger than the aperture angle of the imaging unit 6 at each position where light emitted by the lighting for defect inspection of sheet-shaped objects is transmitted through or reflected on the sheet-shaped object 5.

(Third Modification)

Figure 5:
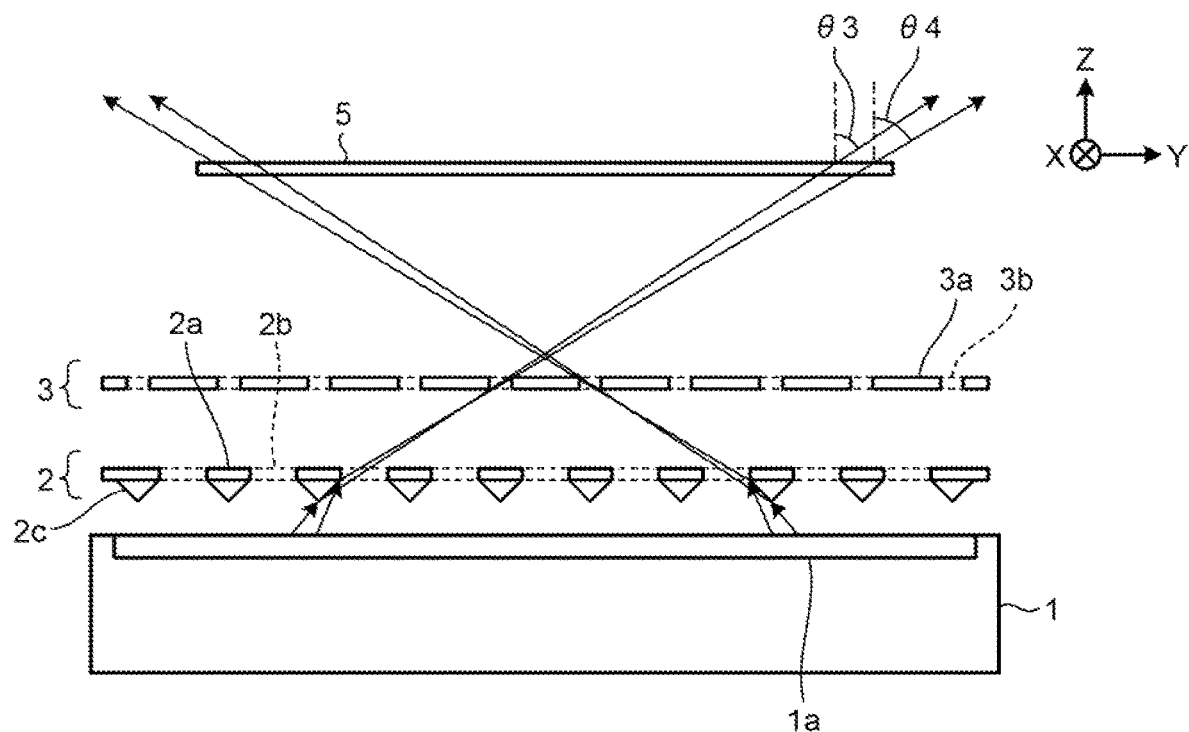
FIG. 5 is a schematic view of defect inspection lighting of a third modification in which light reflection members are provided on the first light shielding unit in the lighting for defect inspection of sheet-shaped objects illustrated in FIG. 2.

The lighting for defect inspection of sheet-shaped objects according to the present invention may further include a configuration other than that illustrated in FIG. 2. See FIG. 5. FIG. 5 is a schematic view of defect inspection lighting of a third modification in which light reflection members 2c are provided on the first light shielding unit 2 in the lighting for defect inspection of sheet-shaped objects illustrated in FIG. 2. The light reflection members 2c capable of reflecting or scattering light from the light emitting portion 1a are provided on the sides of the light shielding sections 2a of the first light shielding unit 2 corresponding to the light application unit 1. The light reflection members 2c are shaped to protrude toward the light application unit 1. According to the third modification, the light emission component that is blocked by the light shielding sections 2a of the first light shielding unit 2 and thus not applied to the sheet-shaped object 5 is reflected or scattered by the light reflection members 2c to change the light path of the light emission component, so that the light can be transmitted through the opening sections 2b and 3b and applied to the sheet-shaped object 5. The light thus applied to the sheet-shaped object 5 via the light reflection members 2c is light at an angle in the range from the minimum emission angle $\theta 3$ to the maximum emission angle $\theta 4$. Since it is preferable that the light reflection members 2c be illuminated with light having the same amount and inclination on the left and right sides when the width direction Y is the right-left direction, the light reflection members 2c preferably have a symmetrical triangular shape but may have any desired shape suitable for the required emission angle range.

Figure 6:
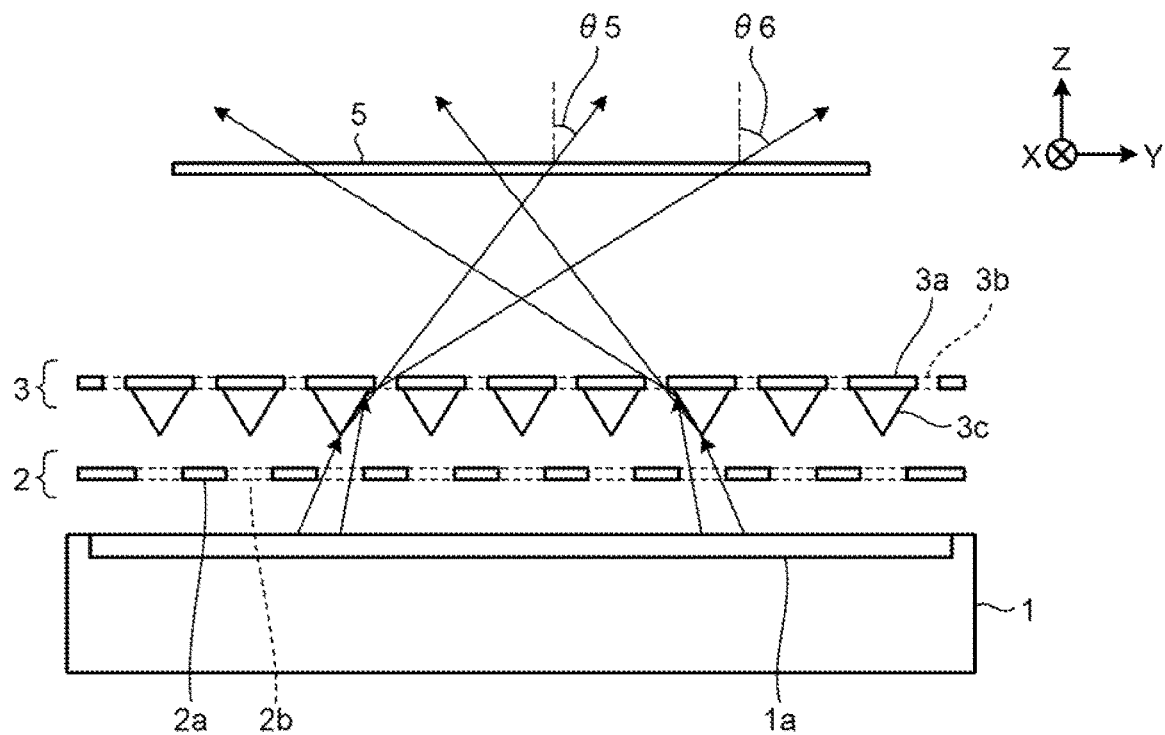
FIG. 6 is a schematic view of defect inspection lighting of a fourth modification in which light reflection members are provided on the second light shielding unit in the lighting for defect inspection of sheet-shaped objects illustrated in FIG. 2.

(Fourth Modification) See FIG. 6. FIG. 6 is a schematic view of defect inspection lighting of a fourth modification in which light reflection members 3c are provided on the second light shielding unit 3 in the lighting for defect inspection of sheet-shaped objects illustrated in FIG. 2. The light reflection member 3c capable of reflecting or scattering light transmitted through the opening sections 2b of the first light shielding unit 2 are provided on the sides of the light shielding sections 3a of the second light shielding unit 3 corresponding to the light application unit 1. The light emission component that is blocked by the light shielding sections 3a of the second light shielding unit 3 after passing through the opening sections 2b of the first light shielding unit 2 and thus not applied to the sheet-shaped object 5 is reflected or scattered by the light reflection member 3c to change the light path of the light emission component, so that the light can be transmitted through the opening sections 3b and applied to the sheet-shaped object 5. The light thus applied to the sheet-shaped object 5 via the light reflection members 3c is light at an angle in the range from the minimum emission angle $\theta 5$ to the maximum emission angle $\theta 6$. In the same manner as the light reflection members 2c, since it is preferable that the light reflection members 3c be illuminated with light having the same amount and inclination on the left and right sides when the width direction Y is the right-left direction, the light reflection members 3c preferably have a symmetrical triangular shape but may have any desired shape suitable for the required emission angle range.

According to the third and fourth modifications, by providing the light reflection members 2c or the light reflection members 3c, part of the light emission component emitted by the light application unit 1 that is blocked by the light shielding sections 2a or the light shielding sections 2b and is not applied to the sheet-shaped object 5 in the embodiment is applied to the sheet-shaped object 5, thereby improving the use efficiency of light.

(Fifth Modification)

Figure 7:
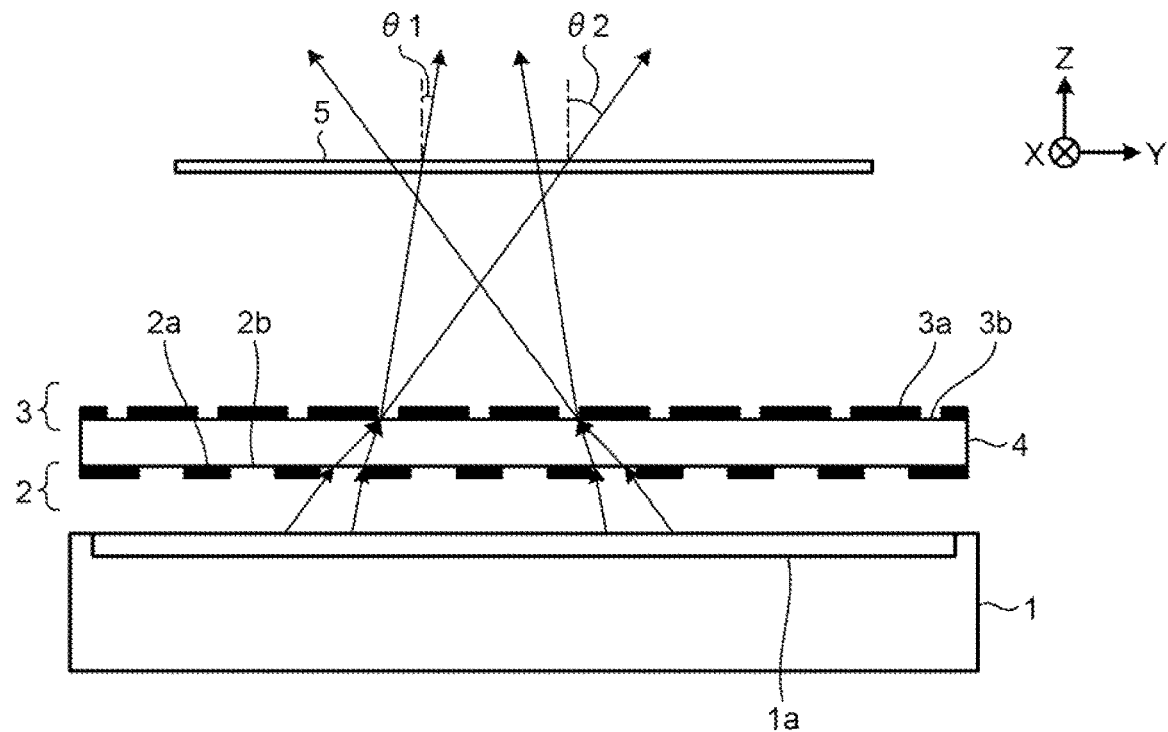
FIG. 7 is a schematic view of another embodiment (fifth modification) of lighting for defect inspection of sheet-shaped objects according to the present invention having a configuration in which a transparent plate-shaped member is provided between the first light shielding unit and the second light shielding unit.

See FIG. 7. FIG. 7 is a schematic view of another embodiment (fifth modification) of lighting for defect inspection of sheet-shaped objects according to the present invention having a configuration in which a transparent plate-shaped member 4 is provided between the first light shielding unit 2 and the second light shielding unit 3. As the transparent plate-shaped member, a glass plate, a transparent resin plate, or the like is preferably used. According to the fifth modification, the refractive index of light is higher than that in a configuration in which air is interposed between the first light shielding unit 2 and the second light shielding unit 3, so that the distance H (see FIG. 2) between the first light shielding unit 2 and the second light shielding unit 3 can be reduced accordingly.

(Sixth Modification)

Figure 8:
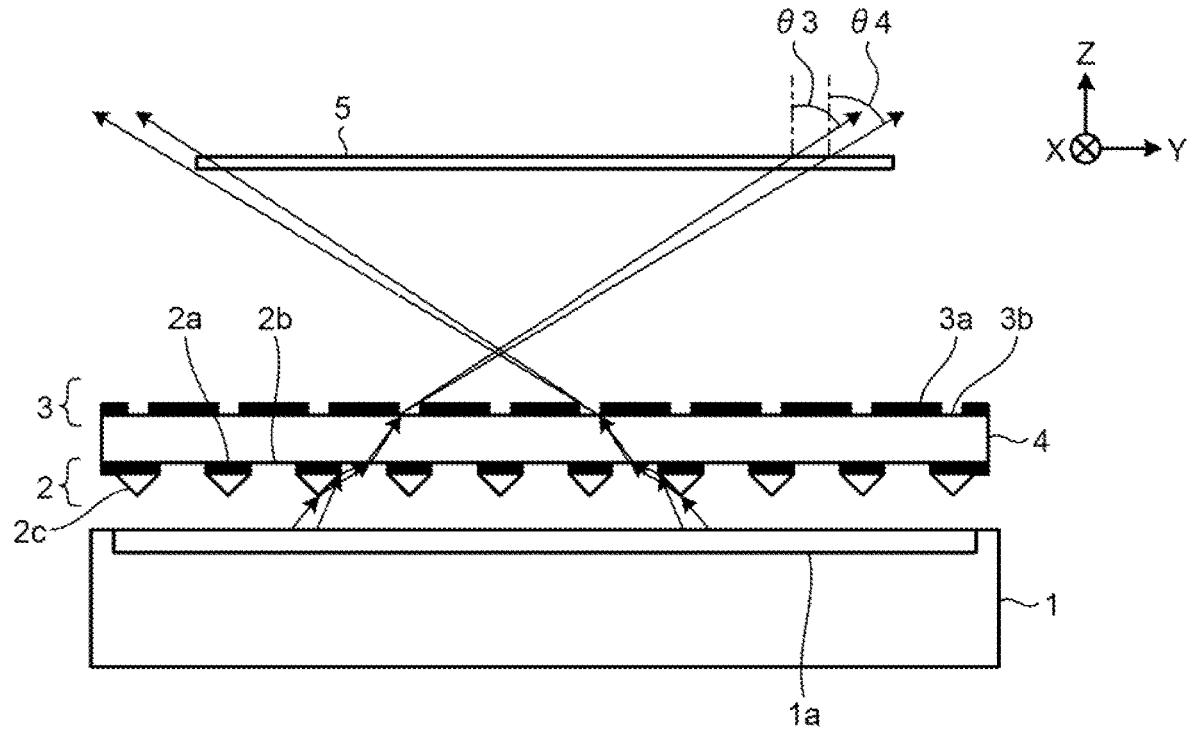
FIG. 8 is a schematic view of an embodiment (sixth modification) of lighting for defect inspection of sheet-shaped objects according to the present invention having a configuration in which light reflection members are provided on the first light shielding unit.

FIG. 8 is a schematic view of an embodiment (sixth modification) of lighting for defect inspection of sheet-shaped objects according to the present invention having a configuration in which a transparent plate-shaped member 4 is provided between the first light shielding unit 2 and the second light shielding unit 3, and light reflection members 2c are also provided on the first light shielding unit. The light reflection members 2c capable of reflecting or scattering light from the light emitting portion 1a are provided on the sides of the light shielding sections 2a of the first light shielding unit 2 corresponding to the light application unit 1. The effects, materials, and shapes of the light reflection members 2c and the plate-shaped member 4 in the embodiment of FIG. 8 are the same as those of the light reflection members 2c in the embodiment of FIG. 5 and the plate-shaped member 4 in the embodiment of FIG. 7.

(Seventh Modification)

Figure 9:
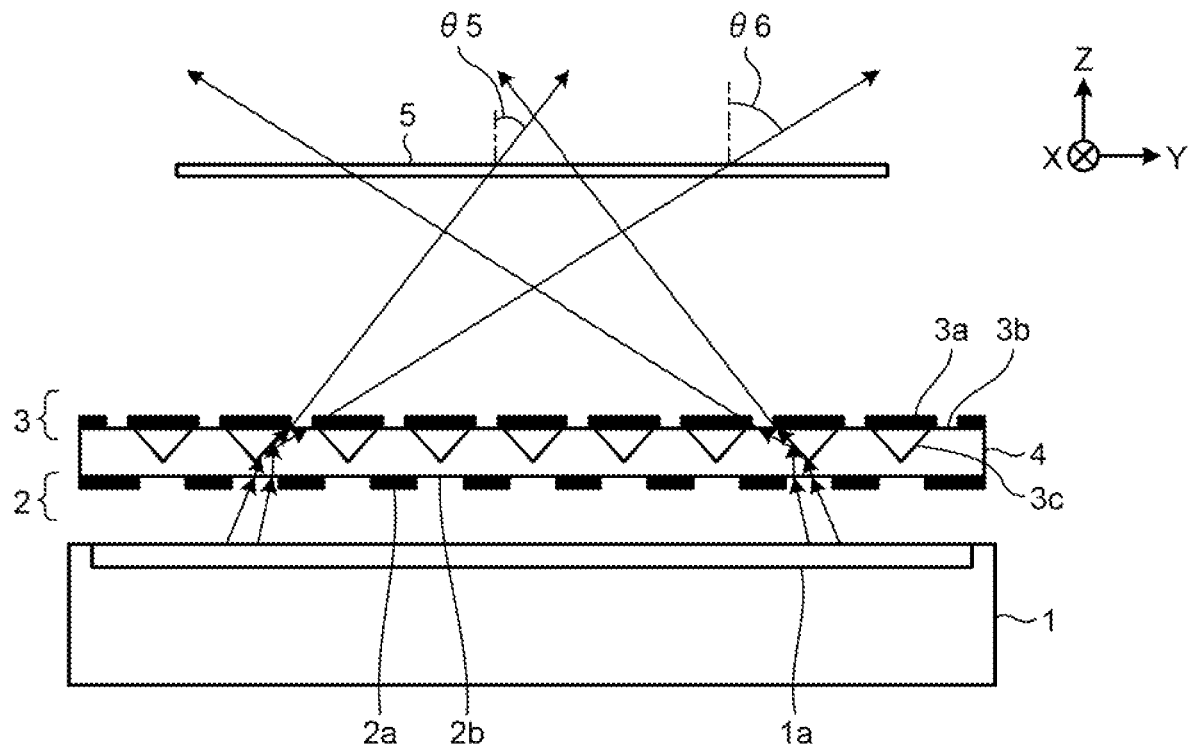
FIG. 9 is a schematic view of an embodiment (seventh modification) of lighting for defect inspection of sheet-shaped objects according to the present invention having a configuration in which light reflection members are provided on the second light shielding unit.

FIG. 9 is a schematic view of an embodiment (seventh modification) of lighting for defect inspection of sheet-shaped objects according to the present invention having a configuration in which a transparent plate-shaped member 4 is provided between the first light shielding unit 2 and the second light shielding unit 3, and light reflection members 3c are also provided on the second light shielding unit. The light reflection member 3c capable of reflecting or scattering light transmitted through the opening sections 2b of the first light shielding unit 2 are provided on the sides of the light shielding sections 3a of the second light shielding unit 3 corresponding to the first light shielding unit 2. The effects, materials, and shapes of the light reflection members 3c and the plate-shaped member 4 in the embodiment of FIG. 9 are the same as those of the light reflection members 3c in the embodiment of FIG. 6 and the plate-shaped member 4 in the embodiment of FIG. 7.

The configuration in which the light reflection members 2c are provided on the light shielding sections 2a of the first light shielding unit 2, the configuration in which the light reflection members 3c are provided on the light shielding sections 3a of the second light shielding unit 3, and the configuration in which the transparent plate-shaped member 4 is provided between the first light shielding unit 2 and the second light shielding unit 3 may be used alone or in a combination of two or more.

(Eighth Modification)

Figure 10:
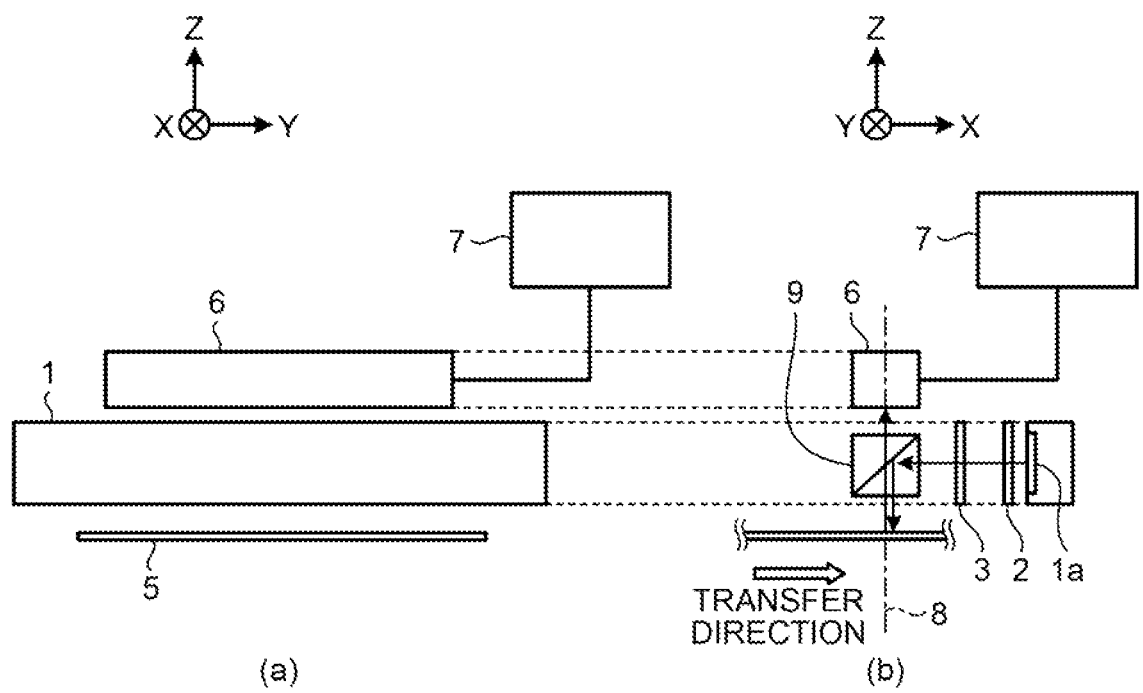
FIG. 10 is a schematic view of another embodiment (eighth modification) of a defect inspection apparatus for sheet-shaped objects according to the present invention having a configuration in which the lighting for defect inspection and the imaging unit are arranged in reflection configuration.

See FIG. 10. FIG. 10 is a schematic view of another embodiment (eighth modification) of a defect inspection apparatus for sheet-shaped objects according to the present invention having a configuration in which the lighting for defect inspection and the imaging unit 6 are arranged in reflection configuration. (a) of FIG. 10 is a plan view illustrating the configuration of the defect inspection apparatus as viewed from the X direction. (b) of FIG. 10 is a plan view illustrating the configuration of the defect inspection apparatus as viewed from the Y direction. In FIG. 10, the light application unit 1 emits light in parallel to the X direction, and part of the light passes through the first light shielding unit 2 and the second light shielding unit 3 and enters a beam splitter 9. Additionally, the light from the sheet-shaped object 5 that has passed through the beam splitter 9 enters the imaging unit 6. The beam splitter 9 bends the light entering from the X direction in the Z direction (toward the sheet-shaped object 5 in this example), and transmits the light entering from the Z direction. In this defect inspection apparatus, the light emitted by the lighting for defect inspection is bent by the beam splitter 9 arranged on the optical center line 8 of the imaging unit and applied to the sheet-shaped object 5, and the light reflected on the sheet-shaped object 5 passes through the beam splitter 9 and is received by the imaging unit 6.

(Ninth Modification)

Figure 11:
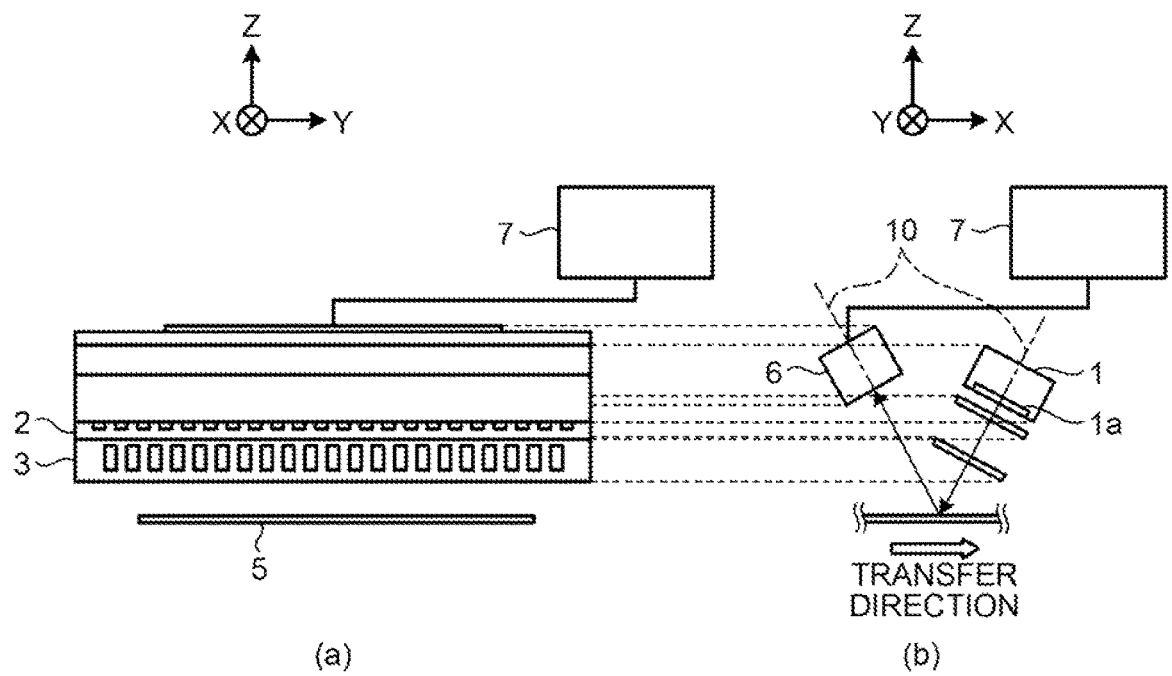
FIG. 11 is a schematic view of another embodiment (ninth modification) of a defect inspection apparatus for sheet-shaped objects according to the present invention having a configuration in which the lighting for defect inspection and the imaging unit are arranged in reflection configuration.

See FIG. 11. FIG. 11 is a schematic view of yet another embodiment (ninth modification) of a defect inspection apparatus for sheet-shaped objects according to the present invention having a configuration in which the lighting for defect inspection and the imaging unit 6 are arranged in reflection configuration. (a) of FIG. 11 is a plan view illustrating the configuration of the defect inspection apparatus as viewed from the X direction. (b) of FIG. 11 is a plan view illustrating the configuration of the defect inspection apparatus as viewed from the Y direction. The lighting for defect inspection is arranged such that the optical axis of the lighting is at an angle to the perpendicular direction (Z direction) relative to the plane of the sheet-shaped object 5. The imaging unit 6 is arranged at a position where the imaging unit 6 receives the light that is emitted by the lighting for defect inspection and specularly reflected on the sheet-shaped object 5.

(Tenth Modification)

Figure 12:
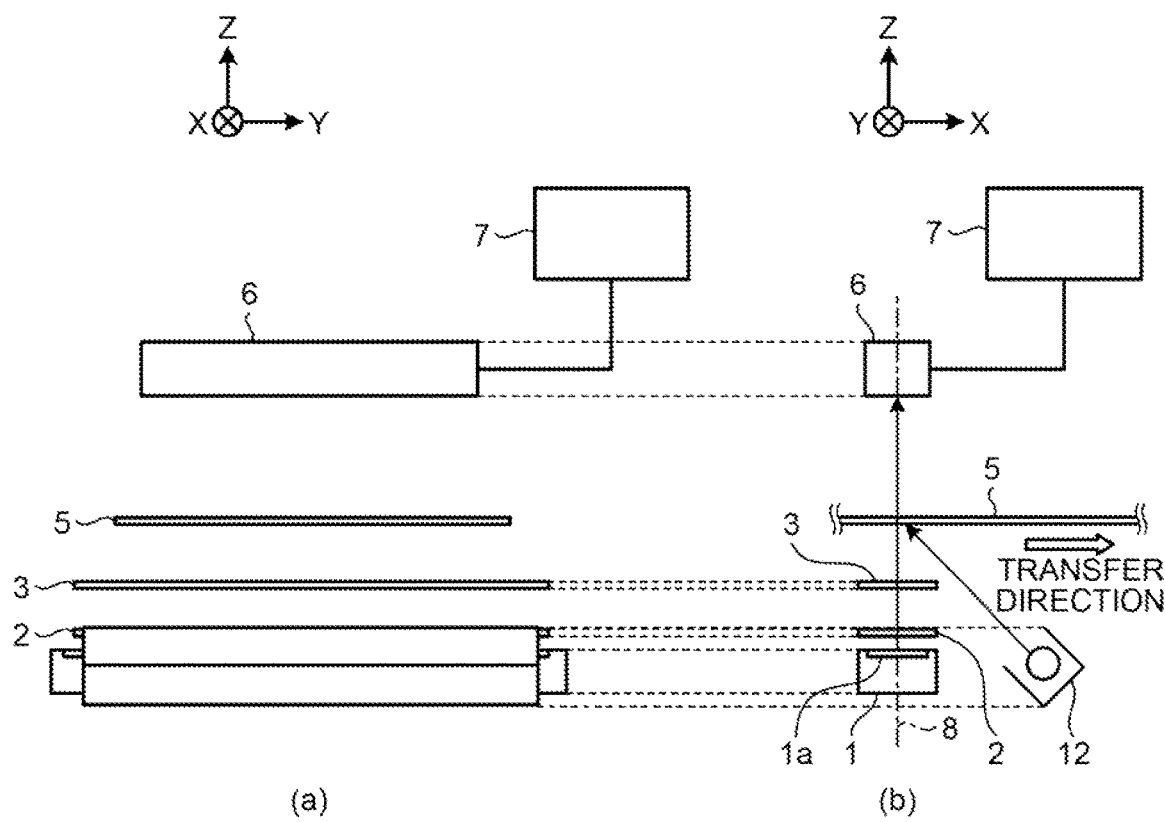
FIG. 12 is a schematic view of another embodiment (tenth modification) of a defect inspection apparatus for sheet-shaped objects according to the present invention having a configuration in which a linear application light source is provided.
Figure 13:
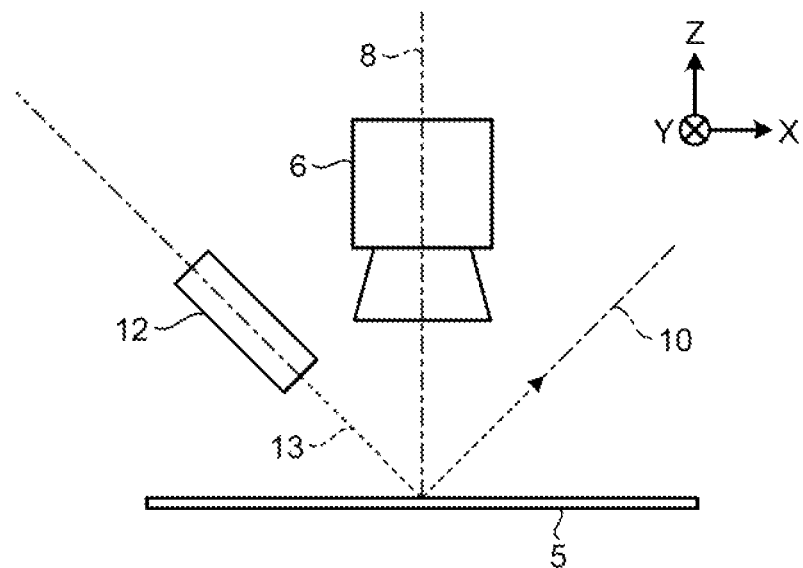
FIG. 13 is a diagram illustrating the principle of defect detection that causes light to be reflected on the inspection target for inspection.
Figure 14:
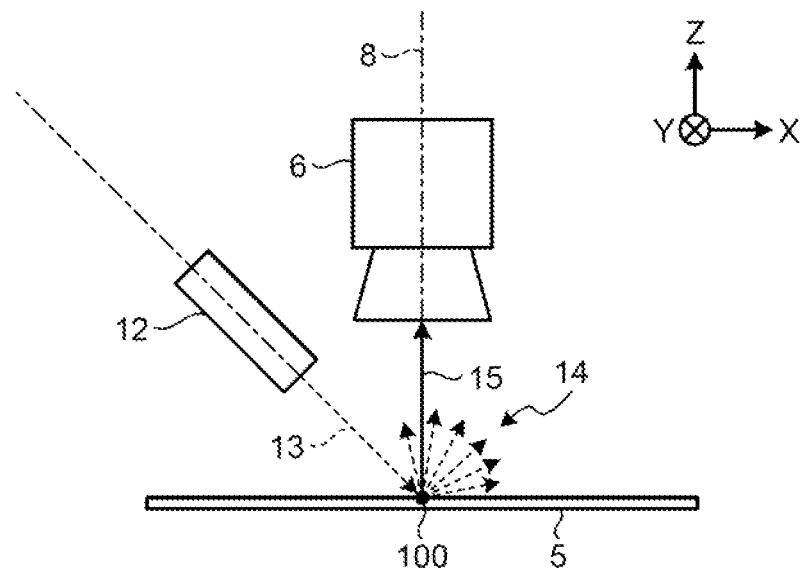
FIG. 14 is a diagram illustrating the principle of defect detection that causes light to be reflected on the inspection target for inspection.
Figure 15:
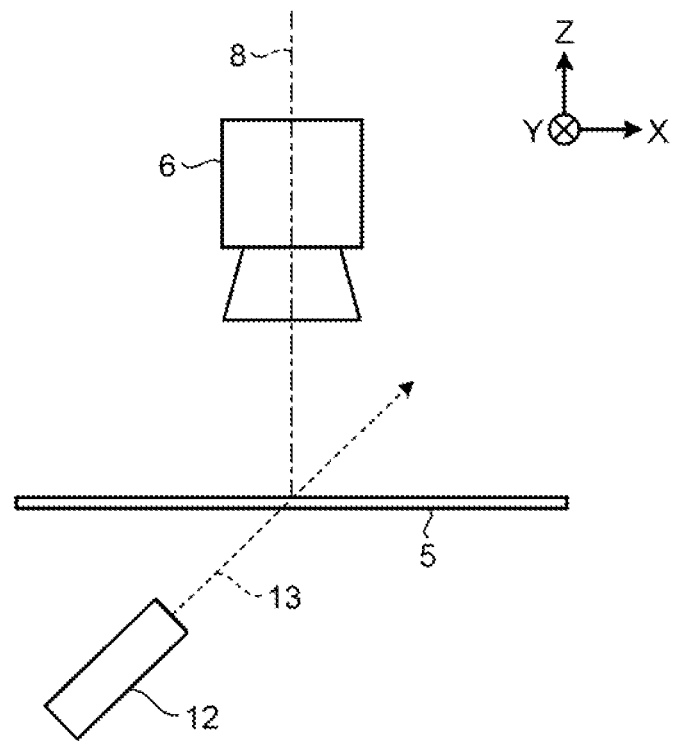
FIG. 15 is a diagram illustrating the principle of defect detection that causes light to be transmitted through the inspection target for inspection.
Figure 16:
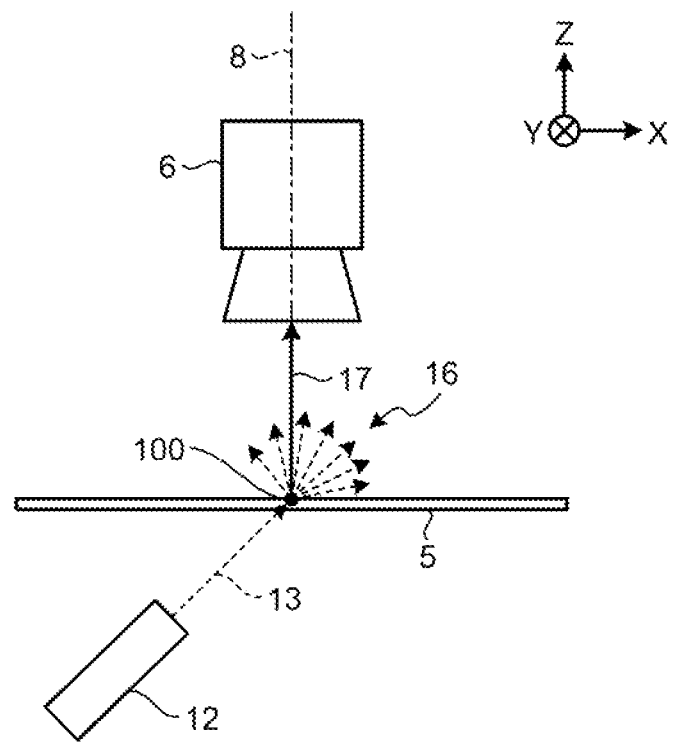
FIG. 16 is a diagram illustrating the principle of defect detection that causes light to be transmitted through the inspection target for inspection.
Figure 17:
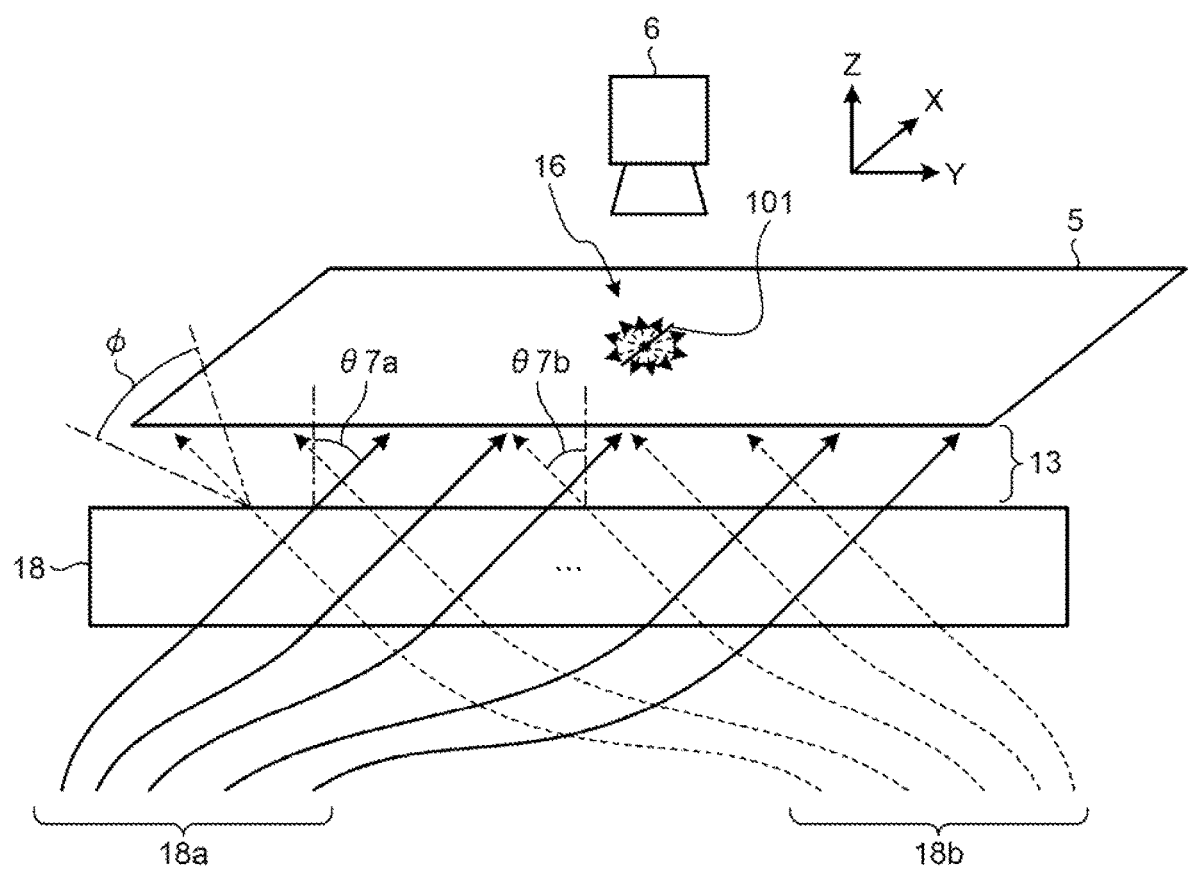
FIG. 17 is a perspective view schematically illustrating an embodiment disclosed in Patent Literature 1.

See FIG. 12. FIG. 12 is a schematic view of another embodiment (tenth modification) of a defect inspection apparatus for sheet-shaped objects according to the present invention having a configuration in which a linear application light source 12 is provided in addition to the lighting for defect inspection of sheet-shaped objects according to the present invention. (a) of FIG. 12 is a plan view illustrating the configuration of the defect inspection apparatus as viewed from the X direction. (b) of FIG. 12 is a plan view illustrating the configuration of the defect inspection apparatus as viewed from the Y direction. In the tenth modification, the linear application light source 12 is added to the configuration of the embodiment described above. The linear application light source 12 may be arranged in parallel to the light application unit 1 so as to apply light to a position where the lighting for defect inspection of sheet-shaped objects applies light to the sheet-shaped object 5. The linear application light source 12 may be arranged on either the upstream side or the downstream side with respect to the transfer direction of the sheet-shaped object 5, or may be arranged on both sides. Furthermore, the linear application light source 12 may be arranged opposite to the imaging unit 6 with respect to the sheet-shaped object 5 such that the light is transmitted, or may be arranged at a position where the light applied to the sheet-shaped object 5 is reflected. By providing the linear application light source 12, the inspection sensitivity for a defect 100 that is long in the width direction Y of the sheet-shaped object, for example, is also achieved.

INDUSTRIAL APPLICABILITY

The present invention is applicable not only to the inspection of defects present on a sheet-shaped or plate-shaped material, but also to the inspection of defects such as minute unevenness or extraneous matter. However, the scope of application is not limited to these.

REFERENCE SIGNS LIST

1 Light application unit
1a Light emitting portion
2 First light shielding unit
2a Light shielding section
2b Opening section
2c Light reflection member
3 Second light shielding unit
3a Light shielding section
3b Opening section
3c Light reflection member
4 Transparent plate-shaped member
5 Sheet-shaped object
6 Imaging unit
6a Telecentric lens
7 Image processing unit
8 Optical center line of imaging unit
9 Beam splitter
10 Specular reflection optical axis
11 Proximity image sensor
11a One-dimensional light receiving sensor array 11*b* Rod-shaped lens array
12 Linear application light source
13 Application light
14 Reflected scattered light
15 Component of reflected scattered light traveling toward imaging unit
16 Transmitted scattered light
17 Component of transmitted scattered light traveling toward imaging unit
18 Linear light-application unit formed by optical fibers
18*a*, 18*b* Optical fiber bundle
100 Defect
101 Defect parallel to longitudinal direction Y
θ1 Minimum emission angle of light transmitted through two light shielding unit
θ2 Maximum emission angle of light transmitted through two light shielding unit
θ3 Minimum emission angle of light transmitted via reflective sections on the light shielding sections of the first light shielding unit
θ4 Maximum emission angle of light transmitted via reflective sections on the light shielding sections of the first light shielding unit
θ5 Minimum emission angle of light transmitted via reflective sections on the light shielding sections of the second light shielding unit
θ6 Maximum emission angle of light transmitted via reflective sections on the light shielding sections of the second light shielding unit
θ7*a*, θ7*b* Optical axis angle of light emitted by optical fiber bundle
φ Aperture angle of light emitted by optical fiber

The invention claimed is:

1. A lighting for defect inspection of sheet-shaped objects, the lighting being to be used for defect inspection of sheet-shaped objects, the lighting comprising:
an elongated light application unit configured to apply illumination light to a sheet-shaped object, the light application unit extending in a second direction that is orthogonal to a first direction on a surface of the sheet-shaped object, the first direction being a direction in which the sheet-shaped object moves relative to the lighting;
a first light shielding unit that is located on a light path from the light application unit to the sheet-shaped object, the first light shielding unit having light shielding sections and opening sections alternately arranged in a direction parallel to the second direction; and
a second light shielding unit that is located, between the first light shielding unit and the sheet-shaped object, on the light path from the light application unit to the sheet-shaped object, the second light shielding unit having light shielding sections and opening sections alternately arranged in a direction parallel to the second direction,
wherein:
the opening sections of the first light shielding unit are located between the light shielding sections of the second light shielding unit and the light application unit in a third direction orthogonal to the first and second directions,
the opening sections of the first light shielding unit have a smaller length in the second direction than the light shielding sections of the second light shielding unit, and
the light shielding sections of the first light shielding unit and/or the light shielding sections of the second light shielding unit include, on sides facing the light application unit, light reflection members that protrude toward the light application unit.

2. A defect inspection apparatus for sheet-shaped objects comprising:
the lighting for defect inspection of sheet-shaped objects according to claim 1;
an imaging unit configured to image light that is emitted by the lighting for defect inspection and transmitted through the sheet-shaped object; and
an image processing unit configured to detect a defect occurring in the sheet-shaped object based on imaging data obtained by the imaging unit.

3. The defect inspection apparatus for sheet-shaped objects according to claim 2,
wherein:
a longitudinal direction of the light application unit is parallel to an imaging direction of the imaging unit,
in the imaging unit, optical axes at positions along the imaging direction are parallel to each other, and
at each position at which light emitted by the lighting for defect inspection is transmitted through the sheet-shaped object, an angle formed by a transmission direction of light transmitted through the sheet-shaped object with an optical axis of the imaging unit is larger than an aperture angle of the imaging unit.

4. A defect inspection apparatus for sheet-shaped objects comprising:
the lighting for defect inspection of sheet-shaped objects according to claim 1;
an imaging unit configured to image light that is emitted by the lighting for defect inspection and reflected on the sheet-shaped object; and
an image processing unit configured to detect a defect occurring in the sheet-shaped object based on imaging data obtained by the imaging unit.

5. The defect inspection apparatus for sheet-shaped objects according to claim 4,
wherein:
a longitudinal direction of the light application unit is parallel to an imaging direction of the imaging unit,
in the imaging unit, optical axes at positions along the imaging direction are parallel to each other, and
at each position at which light emitted by the lighting for defect inspection is reflected on the sheet-shaped object, an angle formed by a reflection direction of light specularly reflected on the sheet-shaped object with an optical axis of the imaging unit is larger than an aperture angle of the imaging unit.

6. The defect inspection apparatus for sheet-shaped objects according to claim 3, wherein the imaging unit includes a telecentric lens.

7. The defect inspection apparatus for sheet-shaped objects according to claim 3, wherein the imaging unit includes a one-dimensional light receiving unit having a same length as a length in the imaging direction.

8. The defect inspection apparatus for sheet-shaped objects according to claim 7, wherein the one-dimensional light receiving unit is a contact image sensor.

9. A method of defect inspection of sheet-shaped objects, the method for inspecting presence or absence of a defect of a sheet-shaped object by using a lighting unit and an imaging unit and by imaging light that is emitted by the lighting unit and transmitted through the sheet-shaped object with the imaging unit, the method comprising:
emitting, with the lighting unit, light with which an angle formed by a transmission direction of light transmitted through the sheet-shaped object with an optical axis of the imaging unit is larger than an aperture angle of the imaging unit at each position at which the light emitted by the lighting unit is transmitted through the sheet-shaped object, along a second direction orthogonal to a first direction on a surface of the sheet-shaped object, the first direction being a direction in which the sheet-shaped object moves relative to the lighting unit;

imaging with the imaging unit whose imaging direction is parallel to the second direction of the sheet-shaped object and whose optical axes at positions along the imaging direction are parallel to each other; and determining presence or absence of a defect of the sheet-shaped object by using image data imaged by the imaging unit.

10. A method of defect inspection of sheet-shaped objects, the method for inspecting presence or absence of a defect of a sheet-shaped object by using a lighting unit and an imaging unit and by imaging light that is emitted by the lighting unit and reflected on the sheet-shaped object with the imaging unit, the method comprising:

emitting, with the lighting unit, light with which an angle formed by a reflection direction of specular reflection light reflected on the sheet-shaped object with an optical axis of the imaging unit is larger than an aperture angle of the imaging unit at each position at which the light emitted by the lighting unit is reflected on the sheet-shaped object, along a second direction orthogonal to a first direction on a surface of the sheet-shaped object, the first direction being a direction in which the sheet-shaped object moves relative to the lighting unit;

imaging with the imaging unit whose an imaging direction is parallel to the second direction of the sheet-shaped object and whose optical axes at positions along the imaging direction are parallel to each other; and determining presence or absence of a defect of the sheet-shaped object by using image data imaged by the imaging unit.

11. The defect inspection apparatus for sheet-shaped objects according to claim 5, wherein the imaging unit includes a telecentric lens.

12. The defect inspection apparatus for sheet-shaped objects according to claim 5, wherein the imaging unit includes a one-dimensional light receiving unit having a same length as a length in the imaging direction.

13. The defect inspection apparatus for sheet-shaped objects according to claim 12, wherein the one-dimensional light receiving unit is a contact image sensor.

* * * * *